US006637354B2

(12) United States Patent  
Ramme

(10) Patent No.: US 6,637,354 B2
(45) Date of Patent: Oct. 28, 2003

(54) COAL COMBUSTION PRODUCTS RECOVERY PROCESS

(75) Inventor: Bruce W. Ramme, Okauchee, WI (US)

(73) Assignee: Wisconsin Electric Power Company, Milwaukee, WI (US)

( * ) Notice: Subject to any disclaimer, the term of this patent is extended or adjusted under 35 U.S.C. 154(b) by 0 days.

(21) Appl. No.: 09/979,480

(22) PCT Filed: Mar. 21, 2001

(86) PCT No.: PCT/US01/09158

§ 371 (c)(1),
(2), (4) Date: Feb. 28, 2002

(87) PCT Pub. No.: WO01/73346

PCT Pub. Date: Oct. 4, 2001

(65) Prior Publication Data

US 2003/0097970 A1 May 29, 2003

Related U.S. Application Data

(60) Provisional application No. 60/192,105, filed on Mar. 24, 2000.

(51) Int. Cl.[7] ................................................. F23B 7/00
(52) U.S. Cl. ...................... 110/342; 110/341; 110/346; 110/347
(58) Field of Search ................................ 110/344, 341, 110/342, 345, 346, 347, 165 A, 165 R; 44/627; 588/256

(56) References Cited

U.S. PATENT DOCUMENTS

| 4,363,735 A | * 12/1982 | Hook | 210/776 |
|---|---|---|---|
| 4,432,868 A | 2/1984 | Aldrich | |
| 4,472,198 A | 9/1984 | Nowicki et al. | |
| 5,860,908 A | 1/1999 | Forrester | |
| 5,992,336 A | 11/1999 | Ramme | |
| 6,139,960 A | 10/2000 | Styron et al. | |
| 6,231,627 B1 | 5/2001 | Reeves et al. | |

FOREIGN PATENT DOCUMENTS

WO   WO 98/29687   7/1998

OTHER PUBLICATIONS

Bruce W. Ramme et al., "Use of Wisconsin Electric Bottom Ash Sand and Gravel as Sub–Base and Base Material for Rigid and Flexible Pavements and Floors", ASCE Materials Engineering Division, May 10, 1999, pp. 1–16.

American Society for Testing and Materials, "Standard Specification for Fly Ash and Raw or Calcined Natural Pozzolan for Use as a Mineral Admixture in Portland Cement Concrete", Designation: C 618–99, Jul. 1999.

* cited by examiner

Primary Examiner—Ira S. Lazarus
Assistant Examiner—K. B. Rinehart
(74) Attorney, Agent, or Firm—Quarles & Brady LLP

(57) ABSTRACT

A process for recovering the byproducts of a process that burns coal and for reusing the byproducts is disclosed. The process includes the steps of identifying a disposal site that contains the byproducts (typically flyash and bottom ash), removing at least a portion of the byproducts from the disposal site, analyzing a sample of the portion of the byproducts to determine the loss on ignition of the portion of the byproducts, introducing the portion of the byproducts along with pulverized coal into a pulverized coal furnace if the portion of byproducts have a loss on ignition greater than or equal to a predetermined loss on ignition value (typically greater than or equal to 1 to 5%), and burning the portion of the byproducts in the furnace with the pulverized coal to render the byproducts into a commercially valuable fly ash and bottom ash having very low loss on ignition, typically lower than 3%.

15 Claims, 4 Drawing Sheets

FIG. 2
FIG. 3
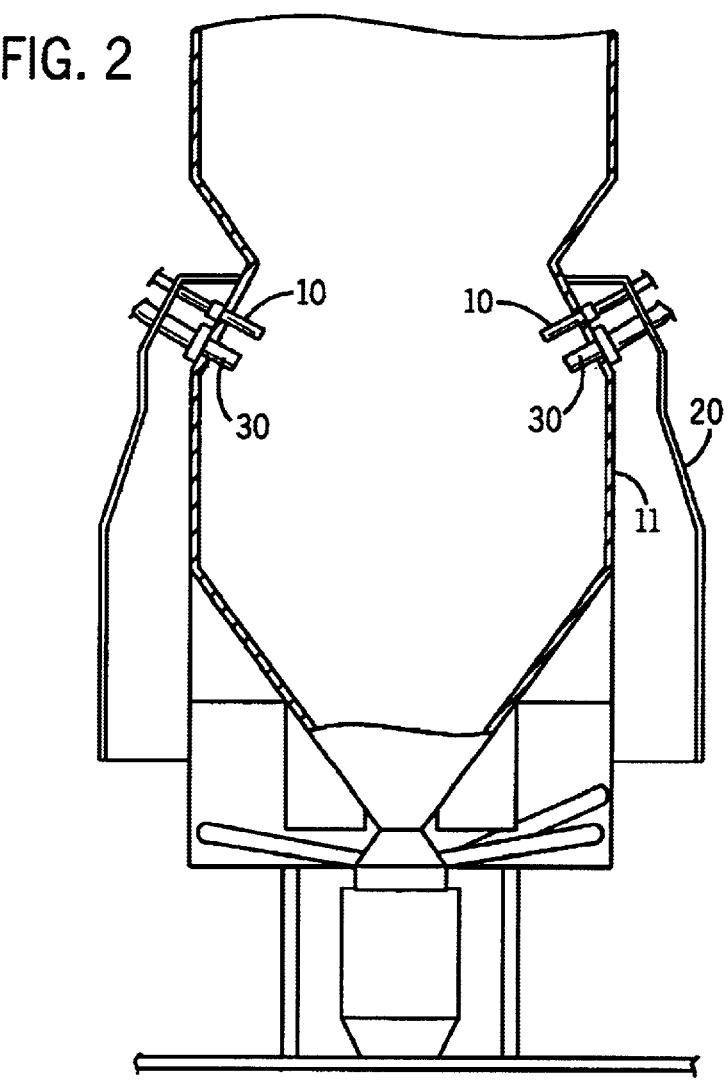
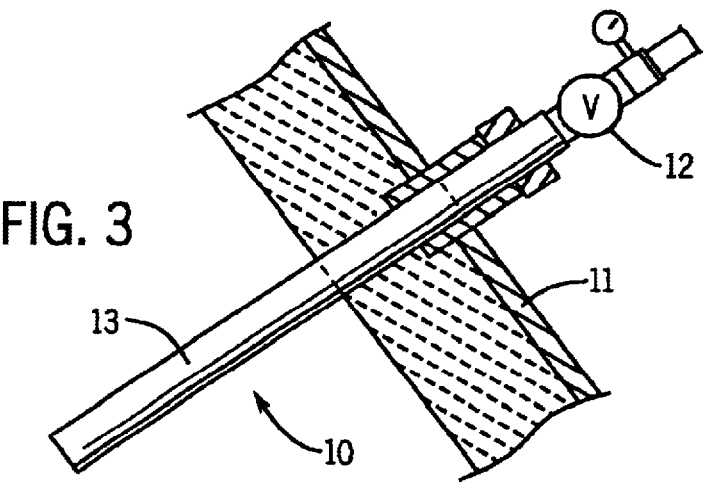

COAL COMBUSTION PRODUCTS RECOVERY PROCESS

CROSS-REFERENCE TO RELATED APPLICATIONS

This application claims priority from U.S. Provisional Patent Application No. 60/192,105 filed Mar. 24, 2000.

BACKGROUND OF THE INVENTION

1. Field of the Invention

This invention relates to the recovery of coal combustion products from landfills, and more particularly to a process for recovering coal ash from landfills and reburning the coal ash in a coal fired boiler.

2. Description of the Related Art

Coal fired boilers are widely used to generate steam for producing electricity. A common form of boiler uses a pulverized coal that is injected into a furnace. Millions of tons of coal ash result each year from such operations. The coal ash includes fly ash with a minor proportion of bottom ash. Some of the coal ash is commercially usable in concrete, concrete products, cement production, sewage sludge stabilization, pavement base materials, lightweight aggregate, and other miscellaneous purposes. The remaining coal ash must generally be disposed of by landfilling since it has no commercial value.

A principal reason for a lack of commercial value for coal ash is the presence of unburned carbon in the ash. (When using the term "carbon content in ash", the carbon content is as measured by loss on ignition.) According to ASTM (American Society for Testing and Materials) C 618 "Standard Specification for Fly Ash and Raw or Calcined Natural Pozzolan for Use as a Mineral Admixture in Portland Cement Concrete", a fly ash must have a loss on ignition (LOI) value no higher than 6% for use in concrete. An upper limit of 3% LOI is more realistic. Higher loss on ignition ash cannot be used because of color problems and concerns for durability under freezing and thawing conditions. The residual carbon content in the coal ash depends upon a variety of factors including base line furnace operation and boiler design. It also depends upon the source of the coal fuel. For example, subbituminous western coal, when burned, will typically result in a low carbon ash with a loss on ignition of less than 5%. However, when bituminous coal is burned, a higher carbon ash with a loss on ignition significantly greater than 5% is generally produced as a byproduct.

Because of the widespread use of coal fired boilers to generate steam for producing electricity, it can be appreciated that significant volumes of coal ash have been deposited in landfills over the years, particularly in regions where electricity was or is still being generated by burning bituminous coal in a coal fired boiler. In addition, the use of greenhouse gas emission technologies, such as low NOx burners, have a tendency to increase the loss on ignition of a coal fired boiler's fly ash and thereby make the fly ash unusable because of high carbon content (e.g., LOI>6%). As a result, a coal fired boiler using greenhouse gas emission technologies will also produce coal ash that must be landfilled. It is also well known that landfill space is rapidly dwindling in many regions and that the construction of new landfills is very costly and, in some regions, is not even an option because of the scarcity of available landfill sites.

Accordingly, there is a need for a process that can recover coal combustion products from a landfill in order to free up landfill space for the disposal of other products, and thereby eliminate the need for the construction of additional landfills. More particularly, there is a need for a process that can recover coal combustion products from a landfill in order to free up landfill space and that can cost effectively produce commercially usable products such that the process is economically attractive.

SUMMARY OF THE INVENTION

The foregoing needs are met by a process according to the invention wherein a disposal site that contains coal combustion products is identified, the coal combustion products are recovered from the disposal site, and the recovered coal combustion products are reused. In one version of the invention, the process comprises using the coal combustion products removed from the disposal site as an aggregate for construction projects. In another version of the invention, the step of reusing the coal combustion products comprises: introducing pulverized coal into a pulverized coal fired furnace; introducing the recovered coal combustion products into the pulverized coal fired furnace; and burning the recovered coal combustion products in the furnace along with the pulverized coal in a manner such as that described in U.S. Pat. No. 5,992,336 and PCT International Publication Number WO 98129687, which are incorporated herein by reference.

In yet another version of the invention, the step of reusing the coal combustion products comprises: analyzing the recovered coal combustion products to determine the loss on ignition of the recovered coal combustion products; introducing pulverized coal into a pulverized coal fired furnace, the pulverized coal typically being subbituminous coal or other coal which generates low loss on ignition ash upon burning; introducing the recovered coal combustion products into the pulverized coal fired furnace if the recovered coal combustion products have a loss on ignition greater than or equal to about 5%, and reburning any recovered coal combustion products introduced into the furnace with the pulverized coal (the recovered coal combustion products typically being in the range of 0.5% to 3.5% by weight of the pulverized coal) to produce a coal ash having a low loss on ignition. In this version of the invention, landfilled coal combustion products which have a loss on ignition greater than or equal to about 5% (and therefore, limited commercial value) are reburned to produce a coal ash which has a loss on ignition less than about 3% (and therefore commercial value in concrete). As a result, this version of the invention provides a number of key advantages. For instance, the invention: (1) frees up landfill space; (2) transforms coal combustion products with no commercial value into coal ash with significant commercial value; (3) recovers lost energy remaining in the coal ash; and (4) removes potential future environmental risk associated with leaching from non-state-of-the-art landfills and ash storage ponds and impoundments.

In still another version of the invention, the step of reusing the coal combustion products comprises: analyzing the recovered coal combustion products to determine the loss on ignition of the recovered coal combustion products; introducing pulverized coal into a pulverized coal fired furnace, the pulverized coal typically being subbituminous coal or other coal which generates low loss on ignition ash upon burning; introducing the recovered coal combustion products into the pulverized coal fired furnace if the recovered coal combustion products have a loss on ignition greater than or equal to about 1%, and reburning any recovered coal combustion products introduced into the furnace with the pulverized coal (the recovered coal combustion products typically being in the range of 1% to 3.5% by weight of the pulverized coal) to produce a coal ash having a low loss on ignition.

It is therefore an advantage of the present invention to provide a coal combustion products recovery process that removes and recovers coal combustion products from a landfill and characterizes the recovered coal combustion products so that the recovered coal combustion products may be put to beneficial use.

It is another advantage of the present invention to provide a coal combustion products recovery process that serves to preserve licensed landfill airspace.

It is still another advantage of the present invention to provide a coal combustion products recovery process that reduces the need for new gravel pits, stone quarries and landfill sites.

It is yet another advantage of the present invention to provide a coal combustion products recovery process that allows for the recovery and reburning of high loss on ignition landfilled coal combustion products, such as formed from a pulverized coal furnace burning bituminous coal, to render the coal combustion products into a commercially valuable fly ash and bottom ash having very low loss on ignition.

It is another advantage of the present invention to provide a coal combustion products recovery process that preserves present coal reserves by recovering heat, as commonly measured by British thermal units (Btu), from reclaimed coal combustion products.

It is still another advantage of the present invention to provide a coal combustion products recovery process that produces a low loss on ignition coal ash that may be substituted for portland cement thus offsetting additional portland cement production and thereby reducing air emissions from the portland cement production process.

BRIEF DESCRIPTION OF THE DRAWINGS

These and other features, aspects, objects, and advantages of the present invention will become better understood upon consideration of the following detailed description, appended claims and accompanying drawings where:

FIG. 2 is a partial view in vertical cross-section of the furnace of FIG. 1 illustrating the location of fly ash injection nozzles;

FIG. 3 is a view in elevation of an injection pipe for injecting coal ash into the furnace of FIG. 2.

Figure 1:
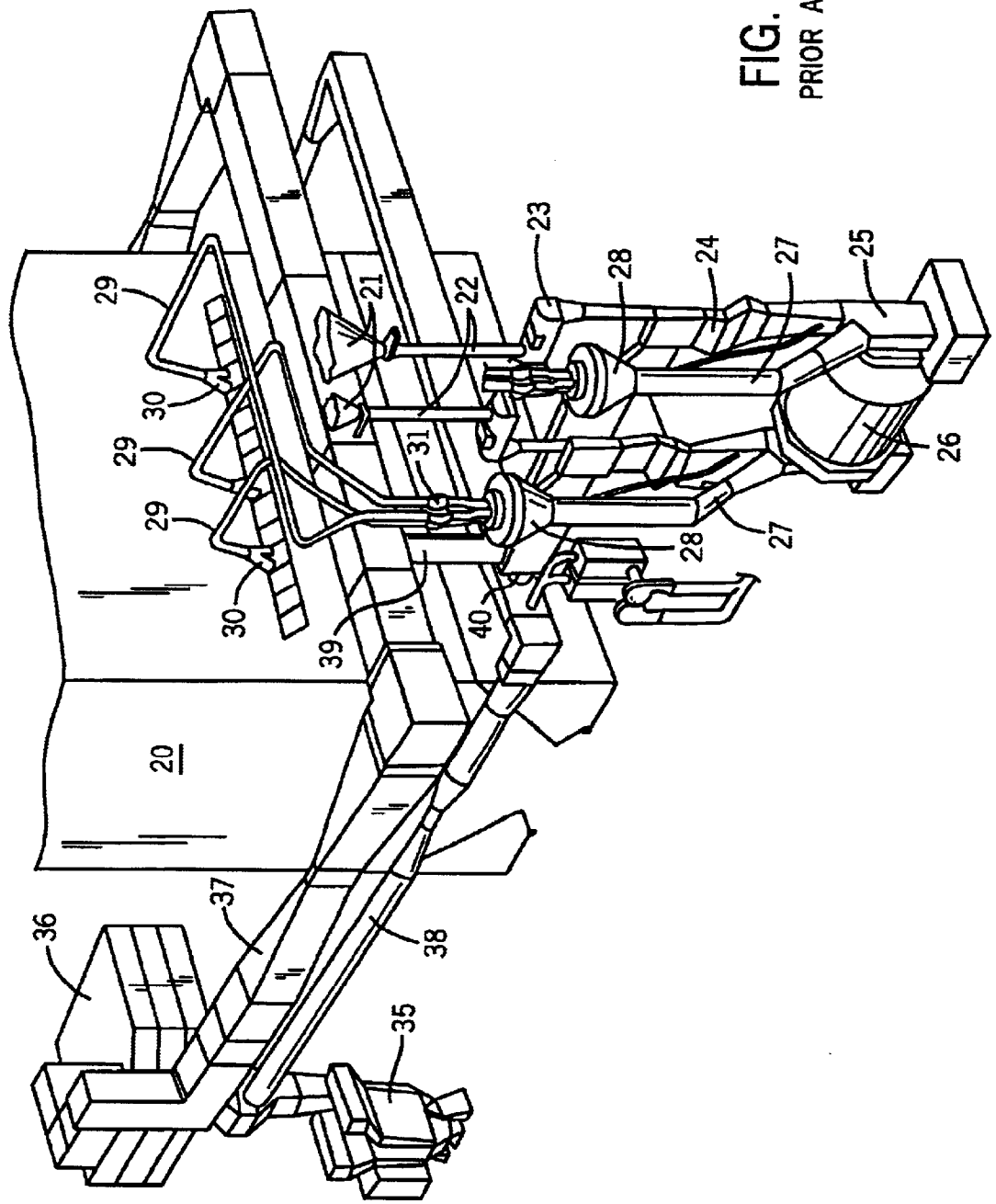
FIG. 1 is a view in perspective of a portion of a typical pulverized coal fired furnace which may be modified to carry out the method of the present invention.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE INVENTION

The invention provides a process for reclaiming and reusing coal combustion products that have been previously placed in a licensed or unlicensed landfill or disposal area. As used herein, a disposal area also includes ponded coal combustion products. While numerous uses of the reclaimed coal combustion products are contemplated, the reclaimed coal combustion products are particularly useful as: (1) an alternative sand, gravel or crushed stone material for various applications such as road base and sub-base, structural fill, backfill, drainage media, aggregate for concrete, asphalt and masonry, abrasives/traction, and manufactured soil products; and (2) a supplementary fuel and feedstock for production of low carbon (less than about 3%) coal combustion products for various uses. As used herein, "coal combustion products" means any byproduct of a process that burns coal.

One version of a coal combustion products recovery, reclamation and reuse process according to the invention includes the following steps. First, the location of previously landfilled or disposed coal combustion products is identified. After location of a landfill or disposal area containing coal combustion products, the quantity and location of coal combustion products in the landfill or disposal area is determined from prior records and/or from a conventional soils investigation.

Samples of the coal combustion products are then obtained using conventional landfill boring and sampling techniques. This step is particularly important as the coal combustion products placed in existing landfills may include high-volume coal combustion products such as fly ash, bottom ash, and boiler slag, and low-volume coal combustion products such as cooling tower sludge and sludge from coal pile runoff. In the most preferred version of the invention detailed below, it is preferred that the reclaimed coal combustion products only contain coal combustion by-products and that the coal ash not be commingled with other municipal waste, demolition debris, or hazardous waste.

After obtaining samples, the samples are then characterized for potential consistency and categorization to environmental regulatory parameters. For example, the samples may be tested using total elemental analysis techniques and leach parameters analysis techniques to determine the chemical nature of the coal combustion products in the landfill. In certain situations, a TCLP test may be run on the coal combustion products to verify that the coal combustion products have not been commingled with other materials that may be classified under environmental regulations as a hazardous material. Accordingly, the TCLP test can verify that the coal combustion products are a non-hazardous material under existing environmental regulations at the site of recovery and subsequent burning. Preferably, an ASTM D 3987 Water Leach Test is used on the samples to characterize potential recovered coal combustion product leachate characteristics for soil and structural fill type applications. Physical data on consistency and grain size distribution for the coal combustion products may also be obtained from the samples. For example, an ASTM D 4749 Sieve Analysis may be used on the samples. Preferably, an elemental and physical characteristic analysis of the recovered coal combustion products can be compared to an elemental and physical characteristic analysis of bottom ash and fly ash recovered directly from a coal fired boiler.

After the samples of the coal combustion products obtained using the boring techniques have been analyzed, an end use for the coal combustion products can be determined based on this data. For instance, if the original coal combustion products contained cementitious properties, they may be suitable for use as an alternative material for sand, gravel, or crushed stone; or if the original coal combustion products were high in residual energy content, i.e., the original coal combustion products have a high loss on ignition (e.g., greater than 5%), they may be suitable for use as a supplementary fuel as will be described in further detail below.

After an end use for the coal combustion products has been determined, an engineered and staged approach for removal of coal combustion products in a nuisance free manner is identified. For example, in one version of the invention, this involves the staged and planned removal of cover materials such as topsoil, clay or synthetic liners, fill, and rooting zone cover materials if these cover materials are placed over the coal combustion products being reclaimed. Alternatively, the coal combustion products may not be covered in the landfill and therefore, it will not be necessary to remove cover materials. Dust is minimized by using known techniques (such as watering) especially when excavated materials dry out, and surface water runoff is redirected to avoid erosion and loss of the coal combustion products being reclaimed. Sedimentation controls are also used, and leachate collection and treatment techniques are used to address potential nuisance situations, in one version of the invention, engineering plans for the final use and restoration of the property are developed. In addition, it may be necessary to obtain local and state approvals as required to reclaim and recover the subject coal combustion products.

After development of a coal combustion products recovery plan, excavation and processing of the coal combustion products begins. In one version of the invention, excavation is performed using standard earthmoving equipment such as backhoes, excavators, and scrapers. Preferably, dust control is performed by use of water or commercial dust abatement compounds that are compatible with coal combustion products, the environment and the ultimate end use of the coal combustion products. The excavated coal combustion products are then run through crushing and/or screening equipment to remove lumps and chunks as well as any foreign materials. Often, the need for crushing will be dependent on the cementitious qualities of previously placed materials. Some coal combustion products contain large amounts of calcium oxide (CaO) which can hydrate and form hardened masses. These materials when crushed can form alternative materials for sand, gravel, and crushed stone based on their gradations and hardness. In addition, screening may not be necessary in certain cases where the end use does not require specific particle size distributions.

In one version of the invention, the coal combustion products are stored in a pile in a designated area of the landfill, and a representative sample is obtained from the pile for testing using testing guidelines such as those presented in ASTM D 75, "Standard Practice for Sampling Aggregates". In another version of the invention, ASTM D 2234 "Standard Practice for Collection of Gross Sample of Coal" is used to collect samples from a transfer point where the coal combustion products fall onto a conveyor during the reclamation operation. Testing is preferably performed on the samples to measure the following parameters: (1) Leachable—Antimony, Arsenic, Beryllium, Cadmium, Lead, Iron, Thallium and pH; (2) Total—Arsenic, Beryllium and Sulfur; and (3) Dissolved—Aluminum, Antimony and Barium. Of course, additional tests can be performed to determine the concentration of additional elements and organic compounds. Preferably, the samples are also evaluated for homogeneity as homogeneous coal combustion products are preferred. Material that is not suitable for beneficial use (e.g. debris or soil) can be separated from reusable materials. The reclaimed and processed coal combustion products are then stockpiled, and loaded into trucks for hauling in accordance with all applicable regulations.

In another version of the invention, the recovered coal combustion products are analyzed for loss on ignition values, and in the event that the loss on ignition values are greater than or equal to about 5%, the recovered coal combustion products are reburned as described below to render the recovered coal combustion products into a usable fly ash having a low loss on ignition (less than about 3%). While recovered coal combustion products having loss on ignition values greater than or equal to about 5% provide for optimum burning, recovered coal combustion products having loss on ignition values greater than or equal to about 1% can be reburned as described below to render the recovered coal combustion products into a usable fly ash having an even lower loss on ignition, typically less than about %%. As detailed above, low loss on ignition fly ash can then be used in concrete. In this most preferred version of the invention, the recovered coal combustion products are burned as a supplementary fuel in a pulverized coal furnace. However, the results of the analyses of the recovered coal combustion products are first used to perform calculations for air emissions expected upon burning of the recovered coal combustion as a supplementary fuel in the pulverized coal furnace, and all required air permits are obtained.

The recovered coal combustion products to be reburned can be added to loaded coal cars using a front end loader. The recovered coal combustion products can also be added to the coal prior to unloading in a rotary car unloader. The coal cars can then be unloaded in a normal manner and the coal can be transported by a conveyor system to the power plant's coal silos. The recovered coal combustion products will typically have a larger particle size and may require grinding to reduce the particle size of the recovered coal combustion products to the size of the pulverized coal stream. The preferred approach for handling of the recovered coal combustion products is to add it to the supply of coal prior to the coal being ground. However, the recovered coal combustion products may be introduced directly into a boiler along with the other fuel.

Therefore, it can be seen that tests for the particle size of the recovered coal combustion products may be particularly valuable. For instance, recovered ash with a larger particle size may require grinding to reduce it to the size of a pulverized coal stream in a typical pulverized coal furnace. In this case, the preferred approach for handling of the recovered ash is to add it to the store of coal prior to the coal being ground. Ideally, the recovered ash and coal mixture has a grindability index on the Hardgrove scale which is acceptable. Smaller particle size recovered ash typically cannot be introduced into the coal upstream of the mills or other pulverizers because of dusting and mixing problems. However, smaller particle size recovered ash can be introduced with the pulverized coal stream entering the pulverizer classifiers. This has the advantage of thorough mixing upstream of the burners and would require only a slight additional volume of air to transport the recovered ash. Smaller particle size recovered ash can be introduced with the pulverized coal stream at each burner location. Since each classifier typically feeds several burners, the number of feed points for the smaller particle size recovered ash would be greater. Smaller particle size recovered ash can also be introduced with the secondary air flow stream as it enters the pulverized coal furnace. The secondary air flow with the smaller particle size recovered ash provides sufficient mixing. The smaller particle size recovered ash can be introduced through heat-resistant or stainless pipes. The smaller particle size recovered ash can also be introduced into the furnace either above or adjacent to the existing burner level through separate pipes. Injection points through a waterwall could be used, although this may require modifications of the waterwalls in the boilers. The classification of recovered ash into higher and smaller particle sizes will depend on the operating characteristics of the pulverized coal furnace being used.

FIG. 1 illustrates a portion of a typical pulverized coal furnace 20 that may be used to carry out the most preferred version of the invention. The pulverized fuel system includes coal hoppers 21 which connect through a coal spout 22 to a gravimetric feeder 23 which leads to a crusher dryer 24. The crusher dryer 24 extends to a bypass damper 25 which connects to a ball mill 26. The pulverized coal from the ball mill 26 and coal dust from the bypass damper 25 are discharged through coal discharge ducts 27 which lead to a centrifugal classifier 28. In the classifier 28, oversized particles are returned to the ball mill 26 for further processing while proper size particles are fed through coal pipes 29 to flame burners 30 that extend into the side of the furnace 20. Stop valves 31 are inserted in the coal pipe lines 29. A primary air fan 35 forces air through an air heater 36 to a primary air duct 37. A tempering air duct 38 also extends from the fan 35 to the furnace 20. Hot air from the primary air duct 37 is ducted through a hot air damper 39 to the crusher dryers 24 and tempering air is ducted through a damper 40 also to the crusher dryer 24. The air is used to transport the pulverized coal through the coal pipes 29 to the burners 30.

Figure 4:
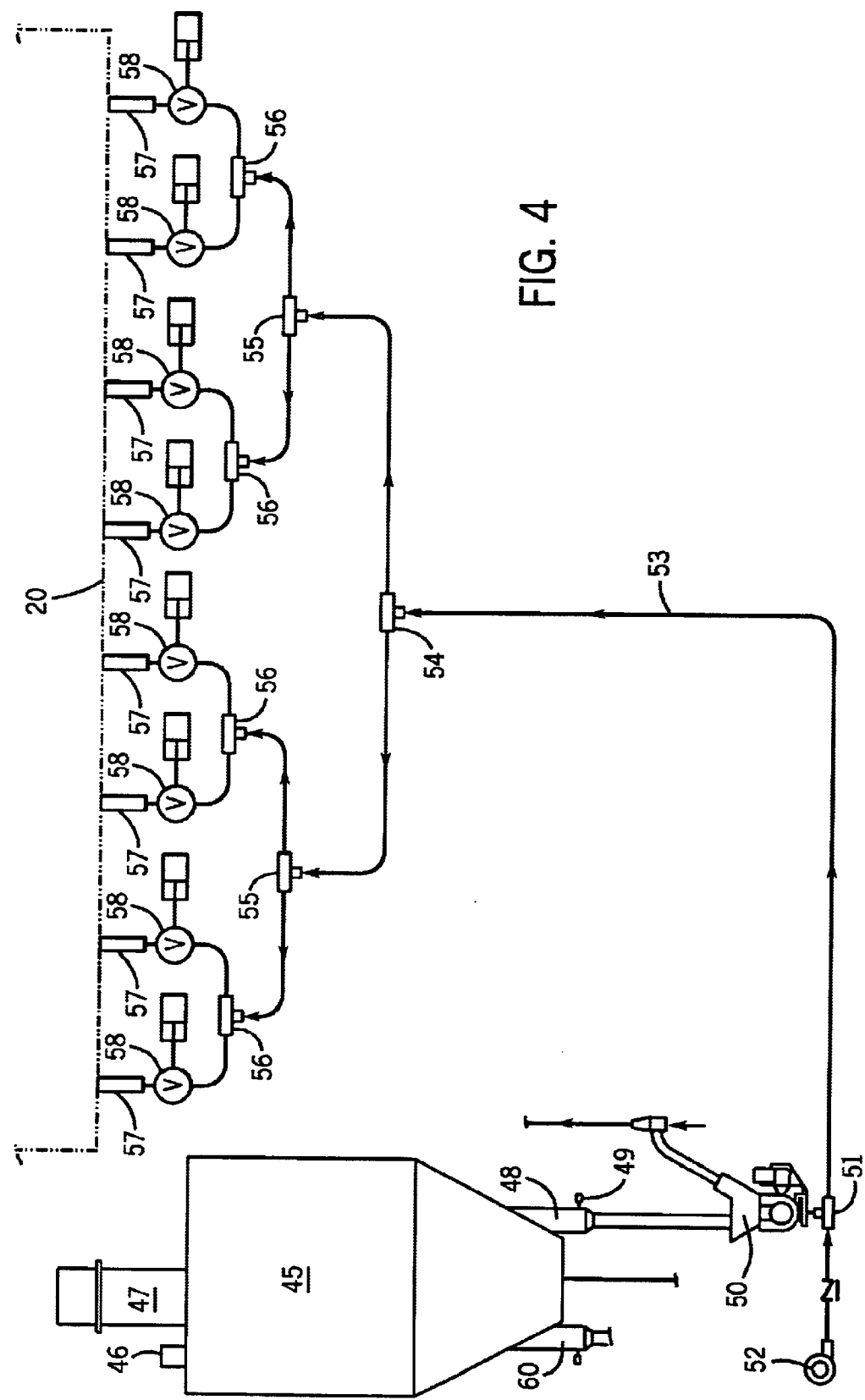
FIG. 4 is a schematic diagram of an installation for carrying out the method of this invention in which coal ash is injected through separate injection lances into the pulverized coal furnace.
Figure 5:
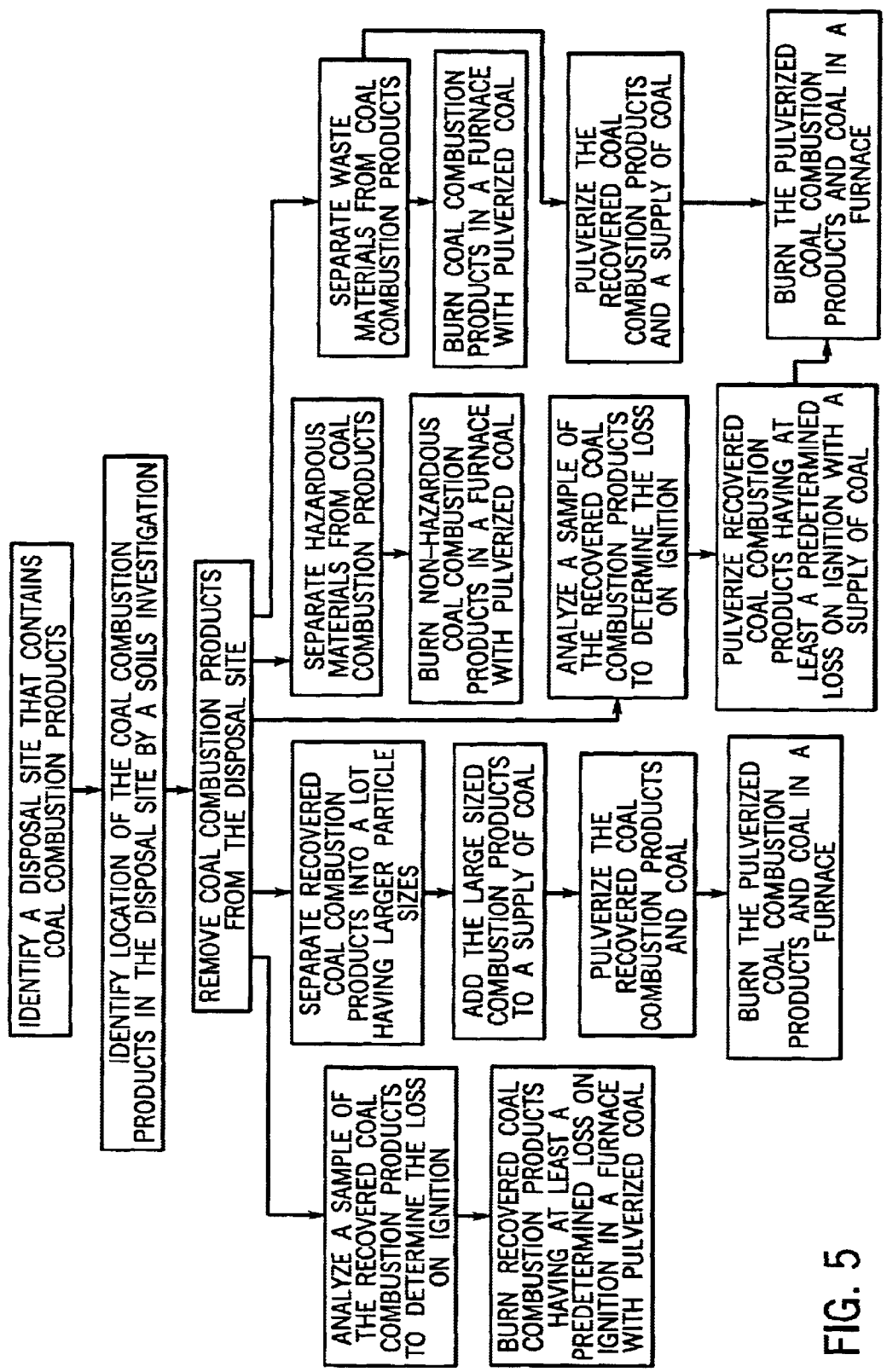
FIG. 5 is a flow chart illustrating the steps in the process according to the invention.

Recovered ash having larger particle sizes may be introduced into the coal hoppers 21 to be processed along with the coal being pulverized. Recovered ash having smaller particle sizes may be added to the pulverized coal stream at the classifiers 28 or at the coal pipes 29. (The classification of recovered ash into higher and smaller particle sizes will depend on the operating characteristics of the pulverized coal furnace being used.) In certain circumstances, the recovered ash having smaller particle sizes is separately dried and pulverized before being added to the pulverized coal stream at the classifiers 28 or at the coal pipes 29. The smaller particle size recovered ash (which may have been separately dried and pulverized) can be injected separately into the furnace 20. Such an arrangement is shown in FIGS. 2 and 4. FIG. 2 shows the typical entry point of the burners 30 into the furnace 20. Injection pipes 10 or lances like that shown in FIG. 3 are disposed slightly above the location of the coal burners 30. FIG. 4 shows a schematic arrangement for injecting the smaller particle size recovered ash through separate injector pipes or lances into a furnace. Referring to FIG. 4, a smaller particle size recovered ash storage silo 45 receives ash through an inlet 46. A bag filter 47 is attached to the top of the silo 45. A coal spout 48 including a cut-off gate 49 feeds a gearmotor-type feeder blower 50 which leads to an intake tee 51. An air blower 52 also connects to the intake tee 51. Air from the blower 52 and smaller particle size recovered ash from the feeder blower 50 are carried through a steel pipe 53 to a splitter 54 which divides the flow in half and feeds two additional splitters 55 where the flow is again divided to four splitters 56 each of which feeds an injection lance 57 which enters the furnace 20. An air cylinder-operated valve 58 is disposed in each of the lines leading to an injection lance 57. A second ash spout 60 extends from the ash silo 45 to feed a similar injection system for the other side of the furnace 20.

The following Example is presented to illustrate the invention and is not intended to limit the invention in any way.

EXAMPLE

Approximately 7,000 cubic yards of coal combustion products were recovered as part of a remediation project at a closed landfill site in Waukesha, Wis., USA. It was determined from records that the coal combustion products comprised fly ash and bottom ash from a Wisconsin Electric Power Plant, and were disposed in the landfill from 1969 to 1978. A sample of the ash was analyzed using ASTM Specifications D 3173, D 3174, D 3175, D 3172, D 3286, and D 4239, and had the following proximate analysis shown in Table 1:

TABLE 1

| Recovered Coal Combustion Products Proximate Analysis % | | |
|---|---|---|
| | As Received | Dry Basis |
| % Moisture | 24.66 | xxxxx |
| % Ash | 69.67 | 92.47 |
| % Volatile | 4.74 | 6.29 |
| % Fixed Carbon | 0.93 | 1.24 |
| Total | 100.00% | 100.00% |
| Btu/lb. | 382 | 507 |
| Loss on Ignition | 5.67% | 7.53% |
| % Sulfur | 0.28 | 0.37 |
| Type of Ash: Bituminous | | |

Upon review of the chemical and physical characteristics of the sample of recovered ash of Table 1, it was determined that the recovered coal combustion products could be introduced along with pulverized coal into a pulverized coal fired furnace and burned to produce a commercially marketable coal ash. Accordingly, the recovered coal combustion products were processed as follows. The coal combustion products excavated from the Waukesha, Wis., USA landfill were first screened to remove large chunks and any foreign materials. The screened recovered coal combustion products were then transported to a receiving hopper which then conveyed the wet/moist recovered coal combustion products (comprising a mixture of bottom ash and fly ash because they were commingled in this landfill) to a 125 ton capacity storage silo where the recovered coal combustion products were then conveyed onto a coal belt at a set addition rate of 1%. The point of entry onto the coal belt was after the coal car dumper but before the primary coal crushers. After being crushed with the coal, the recovered coal combustion products were then transported into the plant coal silos where the recovered coal combustion products were fed to ball mills. The coal and wet/moist recovered coal combustion products mixture was further pulverized in the coal ball mills and then transported into the furnace as fuel.

Thus, there has been provided a coal combustion products recovery process that allows for the recovery and reburning of high loss on ignition landfilled coal combustion products to render the coal combustion products into a commercially valuable fly ash and bottom ash having very low loss on ignition. This process frees up landfill space, transforms coal combustion products with no commercial value into coal ash with significant commercial value, recovers lost energy remaining in the coal ash, and removes potential future environmental risk associated with leaching from non-state-of-the-art landfills.

Although the present invention has been described with reference to certain versions, the invention can be practiced by other than the described versions, which have been presented for purposes of illustration and not of limitation. Therefore, the scope of the appended claims should not be limited to the description of the preferred embodiments contained herein.

What is claimed is:

1. A process for recovering coal combustion products and reusing the coal combustion products, the process comprising:
   (a) identifying a disposal site that contains coal combustion products;
   (b) removing at feast a portion of the coal combustion products from the disposal site;
   (c) introducing the portion of the coal combustion products along with pulverized coal into a pulverized coal fired furnace; and
   (d) burning the portion of the coal combustion products in the furnace with the pulverized coal,
   wherein step (a) further comprises:
       identifying a location of the coal combustion products in the disposal site by a soils investigation.

2. A process for recovering coal combustion products and reusing the coal combustion products, the process comprising:
   (a) identifying a disposal site that contains coal combustion products;
   (b) removing at least a portion of the coal combustion products from the disposal site;
   (c) introducing the portion of the coal combustion products along with pulverized coal into a pulverized coal fired furnace; and
   (d) burning the portion of the coal combustion products in the furnace with the pulverized coal, and
   separating the portion of coal combustion products from materials other than coal combustion products after step (b) and before step (c).

3. A process for recovering coal combustion products and reusing the coal combustion products, the process comprising:
   (a) identifying a disposal site that contains coal combustion products;
   (b) removing at least a portion of the coal combustion products from the disposal site;
   (c) introducing the portion of the coal combustion products along with pulverized coal into a pulverized coal fired furnace;
   (d) burning the portion of the coal combustion products in the furnace with the pulverized coal, and
   analyzing a sample of the portion of the coal combustion products to determine the loss on ignition of the portion of the coal combustion products after step (b) and before step (c),
   wherein the portion of the coal combustion products is introduced along with pulverized coal into the pulverized coal fired furnace if the portion of the coal combustion products has a loss on ignition greater than or equal to a predetermined loss on ignition value, and
   wherein the predetermined loss on ignition value is 1%.

4. The process of claim 3 wherein:
   the predetermined loss on ignition value is 5%.

5. A process for recovering coal combustion products and reusing the coal combustion products, the process comprising:
   (a) identifying a disposal site that contains coal combustion products;
   (b) removing at least a portion of the coal combustion products from the disposal site;
   (c) analyzing a sample of the portion of the coal combustion products to determine the loss on ignition of the portion of the coal combustion products;
   (d) adding the portion of the coal combustion products to a supply of coal to create a recovered coal combustion products and coal mixture if the portion of the coal combustion products has a loss on ignition greater than or equal to a predetermined loss on ignition value;
   (e) pulverizing the recovered coal combustion products and coal mixture to produce a pulverized mixture;
   (f) introducing the pulverized mixture into a pulverized coal fired furnace; and
   (g) burning the pulverized mixture in the furnace,
   wherein the predetermined loss on ignition value is 1%.

6. The process of claim 5 wherein:
   the predetermined loss on ignition value is 5%.

7. A process for recovering coal combustion products and reusing the coal combustion products, the process comprising:
   (a) identifying a disposal site that contains coal combustion products;
   (b) removing at least a portion of the coal combustion products from the disposal site;
   (c) analyzing a sample of the portion of the coal combustion products to determine the loss on ignition of the portion of the coal combustion products;
   (d) adding the portion of the coal combustion products to a supply of coal to create a recovered coal combustion products and coal mixture if the portion of the coal combustion products has a loss on ignition greater than or equal to a predetermined loss on ignition value;
   (e) pulverizing the recovered coal combustion products and coal mixture to produce a pulverized mixture;
   (f) introducing the pulverized mixture into a pulverized coal fired furnace; and
   (g) burning the pulverized mixture in the furnace,
   wherein a fly ash having a loss on ignition of less than about 3% is produced by the process.

8. A process for recovering coal combustion products and reusing the coal combustion products, the process comprising:
   (a) identifying a disposal site that contains coal combustion products;
   (b) removing at least a portion of the coal combustion products from the disposal site;
   (c) analyzing a sample of the portion of the coal combustion products to determine the loss on ignition of the portion of the coal combustion products;
   (d) adding the portion of the coal combustion products to a supply of coal to create a recovered coal combustion products and coal mixture if the portion of the coal combustion products has a loss on ignition greater than or equal to a predetermined loss on ignition value;
   (e) pulverizing the recovered coal combustion products and coal mixture to produce a pulverized mixture;
   (f) introducing the pulverized mixture into a pulverized coal fired furnace;

(g) burning the pulverized mixture in the furnace, and
separating the portion of coal combustion products from materials other than coal combustion products after step (b) and before step (c).

9. A process for recovering coal combustion products and reusing the coal combustion products, the process comprising:
(a) identifying a disposal site that contains coal combustion products;
(b) removing at least a portion of the coal combustion products from the disposal site;
(c) analyzing a sample of the portion of the coal combustion products to determine the loss on ignition of the portion of the coal combustion products;
(d) if the portion of the coal combustion products has a loss on ignition greater than 1% adding the portion of the coal combustion products to a supply of subbituminous coal that generates an ash having a loss on ignition less than 5% upon burning to create a recovered coal combustion products and coal mixture;
(e) pulverizing the recovered coal combustion products and coal mixture to produce a pulverized mixture;
(f) introducing the pulverized mixture into a pulverized coal fired furnace; and
(g) burning the pulverized mixture in the furnace,
whereby a fly ash having a loss on ignition of less than about 3% is produced.

10. The process of claim 9 further comprising:
separating the portion of coal combustion products from materials other than coal combustion products after step (b) and before step (c).

11. The process of claim 10 wherein:
the portion of the coal combustion products is added to the supply of subbituminous coal in the range of 0.5% to 3.5% by weight of the portion of recovered coal combustion products to the subbituminous coal.

12. A process for recovering coal combustion products and reusing the coal combustion products, the process comprising:
(a) identifying a disposal site that contains coal combustion products;
(b) removing at least a portion of the coal combustion products from the disposal site;
(c) analyzing a sample of the portion of the coal combustion products to determine the loss on ignition of the portion of the coal combustion products;
(d) if the portion of the coal combustion products has a loss on ignition greater than 1%, adding the portion of the coal combustion products to a supply of coal that generates an ash having a loss on ignition less than 5% upon burning to create a recovered coal combustion products and coal mixture;
(e) pulverizing the recovered coal combustion products and coal mixture to produce a pulverized mixture;
(f) introducing the pulverized mixture into a pulverized coal fired furnace; and
(g) burning the pulverized mixture in the furnace, whereby a fly ash having a loss on ignition of less than about 3% is produced.

13. A process for recovering coal combustion products and reusing the coal combustion products, the process comprising:
(a) identifying a disposal site that contains coal combustion products;
(b) removing at least a portion of the coal combustion products from the disposal site;
(c) introducing the portion of the coal combustion products along with pulverized coal into a pulverized coal fired furnace; and
(d) burning the portion of the coal combustion products in the furnace with the pulverized coal,
wherein step (c) comprises:
separating the portion of the coal combustion products into a first lot of the coal combustion products and a second lot of the coal combustion products, the first lot having particle sizes greater than the second lot;
adding the first lot of the coal combustion products to a supply of coal to create a recovered coal combustion products and coal mixture;
pulverizing the recovered coal combustion products and coal mixture to produce a pulverized mixture;
Introducing the pulverized mixture into the pulverized coal fired furnace; and
injecting the second lot of the coal combustion products into the pulverized coal fired furnace.

14. A process for recovering coal combustion products and reusing the coal combustion products, the process comprising:
(a) identifying a disposal site that contains coal combustion products;
(b) removing at least a portion of the coal combustion products from the disposal site;
(c) introducing the portion of the coal combustion products along with pulverized coal into a pulverized coal fired furnace; and
(d) burning the portion of the coal combustion products in the furnace with the pulverized coal,
wherein step (c) comprises:
separating the portion of the coal combustion products into a first lot of the coal combustion products and a second lot of the coal combustion products, the first lot being classified as a non-hazardous material under existing environmental regulations at the site of recovery in step (a) and the site of burning in step (d); and
introducing the first lot of the coal combustion products along with pulverized coal into the pulverized coal fired furnace.

15. The process of claim 14 wherein:
the first lot is classified as a non-hazardous material by way of a TCLP test.

* * * * *

UNITED STATES PATENT AND TRADEMARK OFFICE
CERTIFICATE OF CORRECTION

PATENT NO.    : 6,637,354 B2
DATED         : October 28, 2003
INVENTOR(S)   : Bruce W. Ramme It is certified that error appears in the above-identified patent and that said Letters Patent is hereby corrected as shown below:

Column 5,
Line 27, "situations, in" should read -- situations. In --.

Column 6,
Line 21, "%%" should read -- ½% --.

Column 9,
Line 16, "feast" should read -- least --.

Signed and Sealed this

Twenty-seventh Day of April, 2004

JON W. DUDAS
*Acting Director of the United States Patent and Trademark Office*